United States Patent
Dahl et al.

(10) Patent No.: US 11,040,469 B2
(45) Date of Patent: Jun. 22, 2021

(54) MULTI-CAVITY COMPRESSION MOLDING

(71) Applicant: Ford Global Technologies, LLC, Dearborn, MI (US)

(72) Inventors: Jeffrey Scott Dahl, Livonia, MI (US); Patrick James Blanchard, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 625 days.

(21) Appl. No.: 15/651,590

(22) Filed: Jul. 17, 2017

(65) Prior Publication Data

US 2019/0016025 A1    Jan. 17, 2019

(51) Int. Cl.
  *B29C 43/36*   (2006.01)
  *B29C 43/02*   (2006.01)
  *B29C 43/32*   (2006.01)

(52) U.S. Cl.
  CPC .............. *B29C 43/36* (2013.01); *B29C 43/02* (2013.01); *B29C 43/361* (2013.01); *B29C 2043/3233* (2013.01); *B29C 2043/3615* (2013.01)

(58) Field of Classification Search
  CPC ....................... B29C 43/361; B29C 2043/3615
  See application file for complete search history.

(56) References Cited

U.S. PATENT DOCUMENTS

| | | | |
|---|---|---|---|
| 4,341,510 A * | 7/1982 | Croseck | B30B 15/067 100/269.06 |
| 5,338,497 A | 8/1994 | Murray et al. | |
| 5,413,471 A * | 5/1995 | Yamauchi | B29C 45/021 264/272.17 |
| 5,554,327 A | 9/1996 | Ingram et al. | |
| 5,687,598 A | 11/1997 | Kirii et al. | |
| 5,866,177 A | 2/1999 | Ingram | |
| 6,497,566 B2 | 12/2002 | Dahl et al. | |
| 7,001,545 B2 | 2/2006 | Okado et al. | |
| 2015/0104633 A1 | 4/2015 | Blanchard et al. | |
| 2015/0151486 A1 | 6/2015 | Dahl et al. | |

FOREIGN PATENT DOCUMENTS

WO    2011105639 A1    9/2011

OTHER PUBLICATIONS

Dadco, "Ultra Force Nitrogen Gas Springs", Catalog, Jan. 2016, 36 pgs.
Dadco, "Nitrogen Gas Spring Technical Data: Gas Spring Installation Design and Operation", 2013, 2 pgs.

* cited by examiner

*Primary Examiner* — Galen H Hauth
(74) *Attorney, Agent, or Firm* — Vincent Mastrogiacomo Brooks Kushman, P.C.

(57) ABSTRACT

An assembly for compression molding includes an insert housing defining a plurality of apertures having stop surfaces. The assembly includes a plurality of inserts disposed within the apertures and in engagement with the stop surfaces. The assembly further includes a plurality of gas springs in biased engagement with the inserts. Individual gas springs of the plurality of gas springs are adapted to independently compress under load to permit independent movement of individual inserts within the apertures relative to the insert housing.

13 Claims, 5 Drawing Sheets

MULTI-CAVITY COMPRESSION MOLDING

TECHNICAL FIELD

This disclosure relates generally to compression molding, and more particularly to multi-cavity compression molding.

BACKGROUND

Composite articles are well known to provide advantages in diverse applications including, for example, body panels and other components for motor vehicles. In some applications, the advantages of composite articles over metal, ceramic or other materials include weight reduction and the ability to integrate several otherwise individual parts into a single structure. Composite articles of this nature comprise reinforcement material in a polymer based resin, such as a thermoplastic or a thermoset plastic, which is moldable in a first condition but curable (for example, by cooling below the softening point in the case of a thermoplastic) to a form-stable condition. Numerous reinforcement materials are well known to those skilled in the art including, for example, chopped or continuous fibers disposed either randomly or in ordered fashion within the matrix. Exemplary composite materials include a "pre-impregnated" (or "prepreg") composite material, sheet molding compound (SMC) (typically comprising chopped glass fibers in a thermoset resin), and bulk molding compound (BMC) (typically comprising a granulated or putty-like mixture of chopped fibers in a polymer based resin).

In many applications, manufacture of composite articles requires relatively long cycle times, especially for composite articles having large cross-sectional areas such as thick wall sections and the like. The cycle time for such components, that is, the time required for loading composite material into a mold, plus the time required for molding and curing the resin of the composite article at least sufficiently to remove it from the mold, can jeopardize the economic feasibility of the operation in some cases.

To improve efficiency during the manufacture processes, a molding system may be provided with multiple cavities to produce more than one component during a given cycle time. In many such applications, however, there often is a need for better process control across multiple cavities.

SUMMARY

In at least one approach, a compression molding assembly includes a lower assembly defining a plurality of cavities and an upper assembly disposed opposite the lower assembly. In one approach, the plurality of cavities is four or more discrete cavities.

The upper assembly may include an upper clamp plate and an upper cylinder plate secured to the upper clamp plate. The upper cylinder plate may define a plurality of upper cylinder plate apertures disposed therethrough. The upper assembly may further include a gas spring system having a plurality of gas springs secured to the upper clamp plate and disposed in the upper cylinder plate apertures. In one approach, two gas springs are disposed in an individual upper cylinder plate aperture. The individual gas springs of the plurality of gas springs may be linked in fluid communication by one or more conduits. The one or more conduits may be disposed between the upper clamp plate and the upper cylinder plate. Individual gas springs of the plurality of gas springs may include a charging medium adapted to be charged to a pressure in a range of approximately 50 bar to approximately 150 bar.

Individual gas springs of the plurality of gas springs may include a cylinder body and a piston. The upper assembly may further include an upper block secured to the upper cylinder plate. The upper block may include upper block apertures disposed adjacent the upper cylinder plate apertures. The upper block may define stop surfaces disposed at the upper block apertures. The upper assembly may further include a plurality of inserts disposed in the upper block apertures and in engagement with the pistons of the gas springs. An individual insert of the plurality of inserts may include a body portion moveable between a first position wherein the body portion is engaged with the stop surface, and a second position wherein the body portion is spaced from the stop surface.

In at least one approach, the upper block defines an individual upper block aperture having an upper wall portion defining a first width and a lower wall portion defining a second width less than the first width. The stop surface may be disposed between the upper wall portion and the lower wall portion.

The body portion may define a first body portion having a height less than a height of the upper wall portion of the individual upper block aperture. The first body portion may be disposed in the upper wall portion of the individual upper block aperture. The individual insert may further include a second body portion adjacent the first body portion. The second body portion may have a width less than a width of the first body portion. The second body portion may be disposed in the lower wall portion of the individual upper block aperture.

In at least one approach, the individual insert further includes a third body portion adjacent the second body portion. The third body portion may have a width less than the width of the second body portion. The second body portion may be disposed below a bottom wall of the upper block when the first body portion is in engagement with the stop surface.

In at least one approach, a first individual insert is adapted to move a first distance from the first position to the second position, and a second individual insert is adapted to move a second distance from the first position to a third position. The second distance may be greater than the first distance. A first gas spring may be adapted to apply a first force on the first individual insert in the second position, and a second gas spring may be adapted to apply a second force on the second individual insert in the third position. The second force may substantially correspond to the first force.

In at least one approach, a method of compression molding includes inserting molding materials in a plurality of discrete cavities of a first assembly. The method may further include displacing a second assembly to engage the molding materials with a plurality of inserts of the second assembly. Engaging the molding materials may displace the inserts relative to an insert housing of the second assembly. Displacing the inserts may compress gas springs disposed within the second assembly.

Engaging the molding materials may displace a first insert a first distance relative to the insert housing, and a second insert a second distance relative to the insert housing. The second distance may be different than the first distance. A first compressed gas spring may exert a first force on a first molding material through the displaced first insert, and a second compressed gas spring may exert a second force on a second molding material through the displaced second insert. The second force may substantially correspond to the first force.

In at least one approach, an assembly for compression molding includes an insert housing defining a plurality of apertures having stop surfaces. The assembly may further include a plurality of inserts disposed within the apertures and in engagement with the stop surfaces. The assembly may further include a plurality of gas springs in biased engagement with the inserts. Individual gas springs of the plurality of gas springs may be adapted to independently compress under load to permit independent movement of individual inserts within the apertures relative to the insert housing.

The insert housing may define an individual aperture having an upper wall portion defining a first width and a lower wall portion defining a second width less than the first width. A stop surface may be disposed between the upper wall portion and the lower wall portion.

An individual insert may define a first body portion having a height less than a height of the upper wall portion of the individual aperture. The first body portion may be disposed in the upper wall portion of the individual aperture. The individual insert may further include a second body portion adjacent the first body portion. The second body portion may have a width less than a width of the first body portion. The second body portion may be disposed in the lower wall portion of the individual aperture.

In at least one approach, a first individual insert is adapted to move a first distance relative to the insert housing to a first position, and a second individual insert is adapted to move a second distance relative to the insert housing to a second position. The second distance may be greater than the first distance. A first gas spring may be adapted to apply a first force on the first individual insert in the first position, and a second gas spring may be adapted to apply a second force on the second individual insert in the second position. The second force may substantially correspond to the first force.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
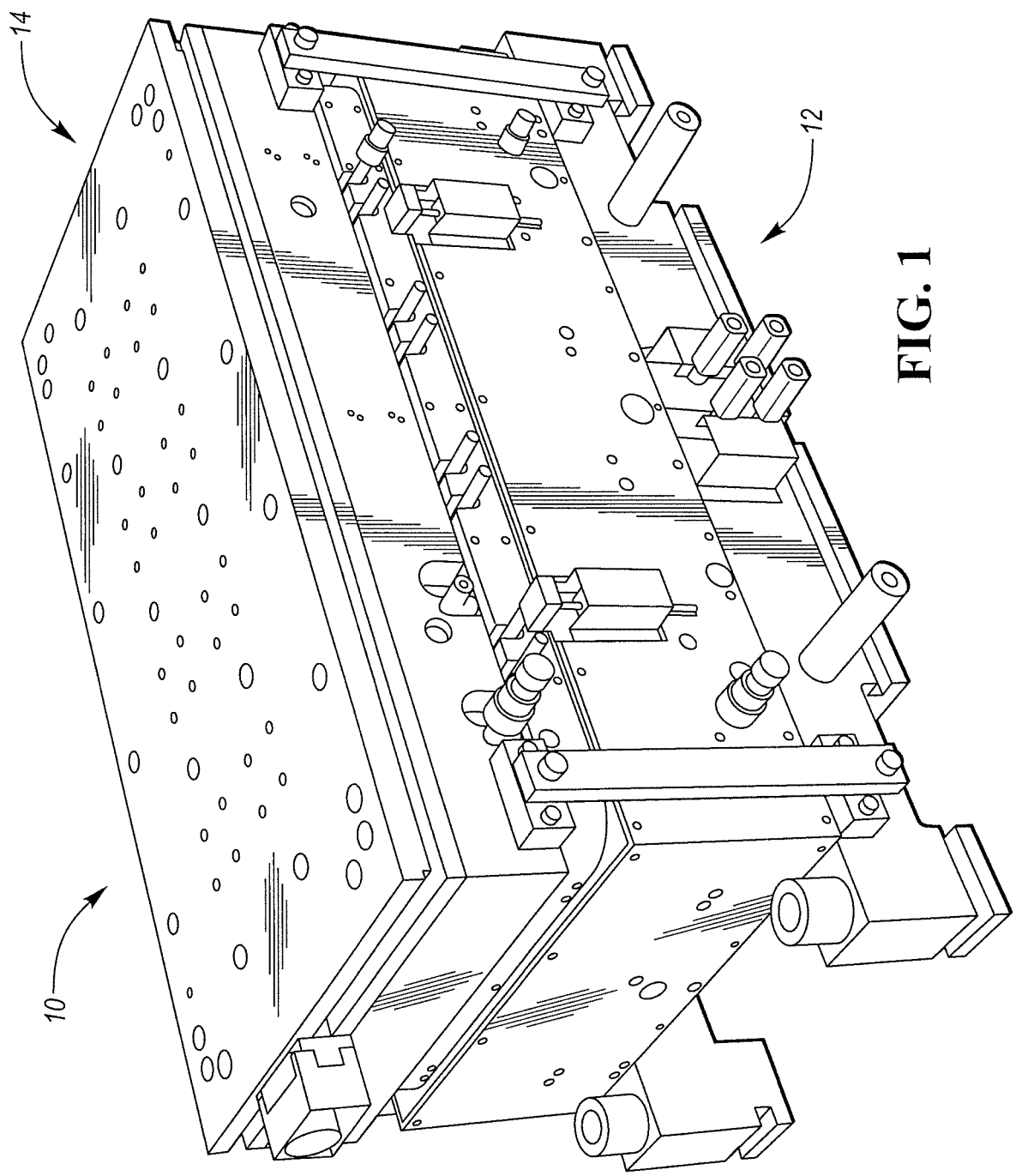
FIG. 1 is a top perspective view of a compression molding system.

Referring now to FIG. 1, a compression molding system 10 includes a first assembly 12 and a second assembly 14. As shown herein the second assembly 14 may be disposed above the first assembly 12. In this way, the first assembly may be referred to as a lower assembly 12, and the second assembly 14 may be referred to as an upper assembly 14.

In use, the upper and lower assemblies 12, 14 may be separated to allow an operator to insert a molding material in the form of a blank or a charge between the upper and lower assemblies 12, 14. The compression molding system 10 may then be closed such that the upper and lower assemblies 12, 14 engage the blank. While closed, the compression molding system 10 may heat the molding material and may also provide compressive forces to mold the molding material into the desired shape.

In one approach, the lower assembly 12 is fixed, and the upper assembly 14 is moveable relative to the lower assembly 12; for example, by lowering the upper assembly 14 to engage the lower assembly 12 and raising the upper assembly 14 to disengage from the lower assembly 12. In another approach, the upper assembly 14 is fixed, and the lower assembly 12 is movable relative to the upper assembly 14; for example, by raising the lower assembly 12 to engage the upper assembly 14 and lowering the lower assembly 12 to disengage from the upper assembly 14.

The molding material may be a thermoset material or a thermoplastic material. In one approach, the molding material is a prepreg composite material having a matrix material and a fiber, filler, or other reinforcement material. The prepreg composite may or may not be partially cured to allow easy handling. Prepreg blanks may be molded, for example, into structural reinforcements for vehicles.

In another approach, the molding material is a sheet molding composite (SMC) material. An SMC sheet or body is comprised of a sandwich formed with a resin paste and chopped glass fibers between sheets of carrier films. Typically, one film is advanced under a box of resin paste which is deposited onto the film. Glass fibers are threaded through a chopping machine which cuts pieces of predetermined lengths and randomly deposits them onto the advancing film and resin paste. A second film having additional resin paste deposited on it is laid atop the first film and compacted into a sandwich. SMC materials may be molded into various kinds of structural automotive components such as body panels (e.g., hoods, fenders, decklids, pickup boxes, pillars, lift gates, and roofs), engine components (e.g., valve covers and oil pans), vehicle frame elements, bumper beams, fan shrouds, and many other types of components.

Figure 2:
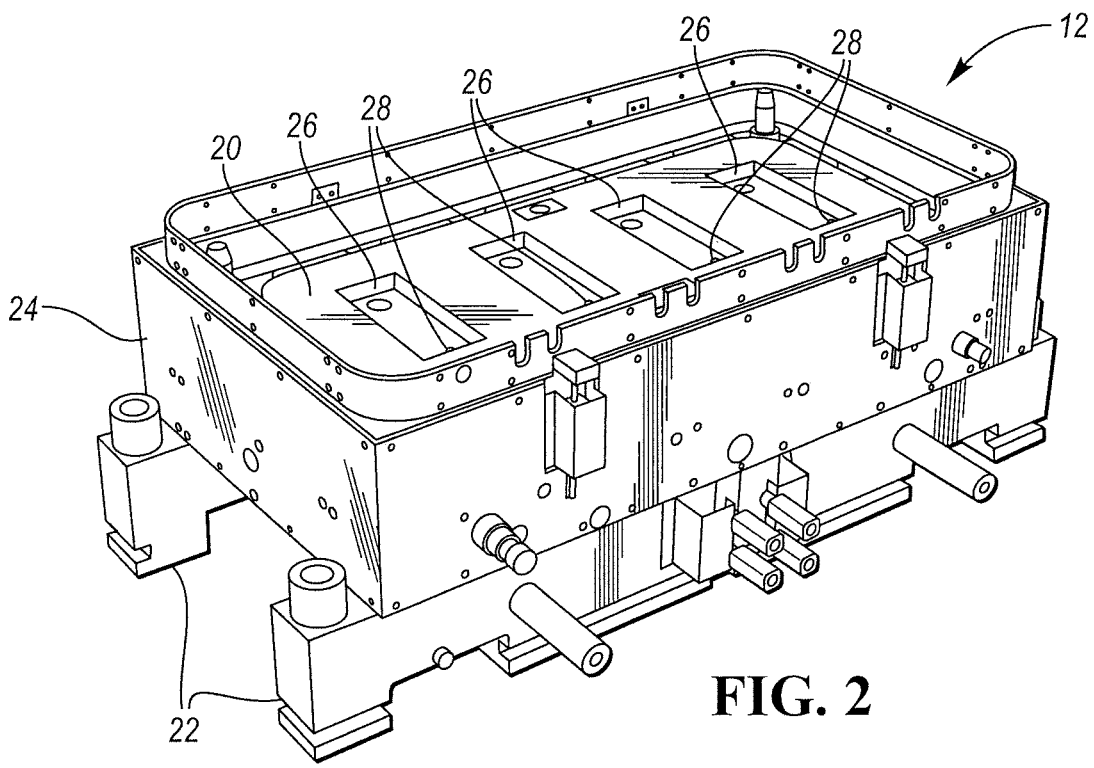
FIG. 2 is a top perspective view of a lower assembly of a compression molding system.

Referring now to FIG. 2, the lower assembly 12 may include a lower block 20, one or more rails 22 for supporting the lower block 20, and an outer assembly 24 disposed about the lower block 20.

The lower block 20 may define one or more cavities 26. The cavities 26 are sized to receive one or more blanks for molding. For example, each cavity may have a horizontal surface area of approximately 100 millimeters by 200 millimeters. The cavities 26 may have mold surfaces having geometries corresponding to a bottom portion of a desired article of manufacture.

In one approach, lower block 20 defines four discrete cavities 26. In other approaches, the lower block 20 may define two discrete cavities, three discrete cavities, or five or more discrete cavities. Any suitable number of discrete cavities may be defined in the lower block 20. As used herein, discrete cavities are spaced apart such that each cavity may permit molding operations independent of the other cavities.

In one approach, each cavity may receive a single blank. In another approach, each cavity may receive multiple blanks. In still another approach, one or more cavities may receive a single blank, while one or more cavities may receive multiple blanks. In this way, multiple components may be molded during one cycle of the compression molding system 10. The multiple components may be of the same component (e.g., four left-hand B-pillar reinforcements), the same type of component (e.g., two left-hand B-pillar reinforcements and two right-hand B-pillar reinforcements), or different components (e.g., a left-hand B-pillar reinforcement, a right-hand B-pillar reinforcement, a left-hand A-pillar reinforcement, and a right-hand A-pillar reinforcement). The molding of multiple components during a single compression cycle may increase component throughput, and may reduce overall manufacturing costs.

One or more pressure transducers 28 may also be provided. In one approach, each cavity 26 is provided with a pressure transducer 28. Each cavity may also include an air poppet valve that may, for example, assist with ejection of a molded part. One or more linear variable differential transformers (LVDT) may also be provided.

Figure 3:
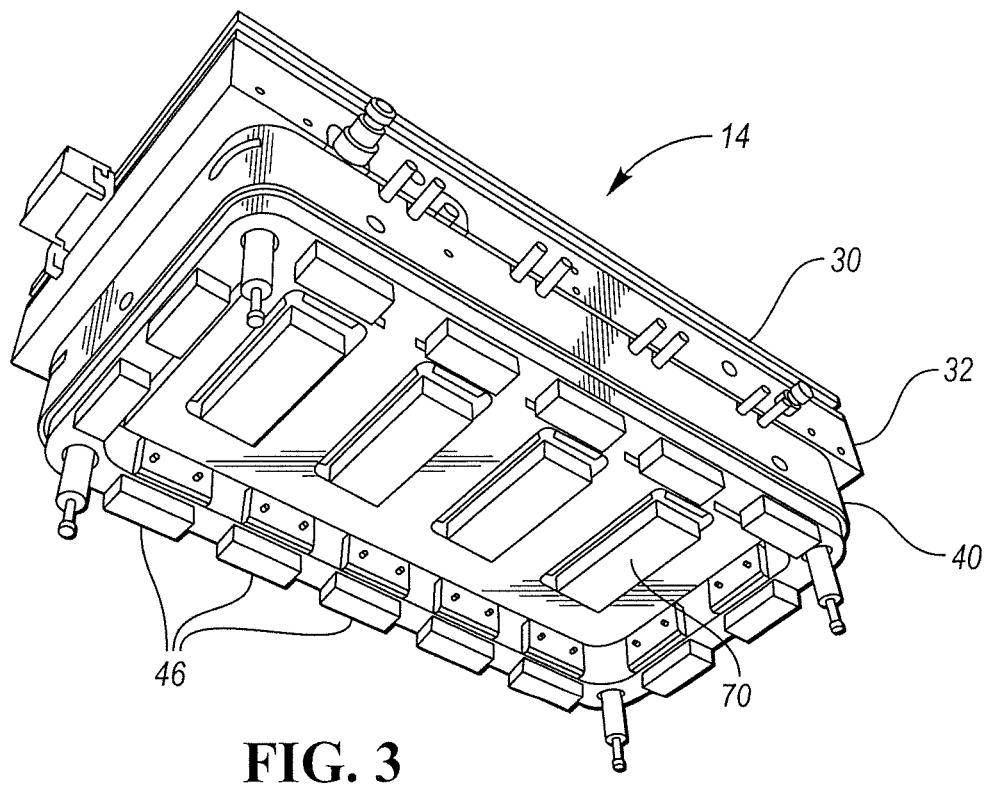
FIG. 3 is a bottom perspective view of an upper assembly of a compression molding system.
Figure 4:
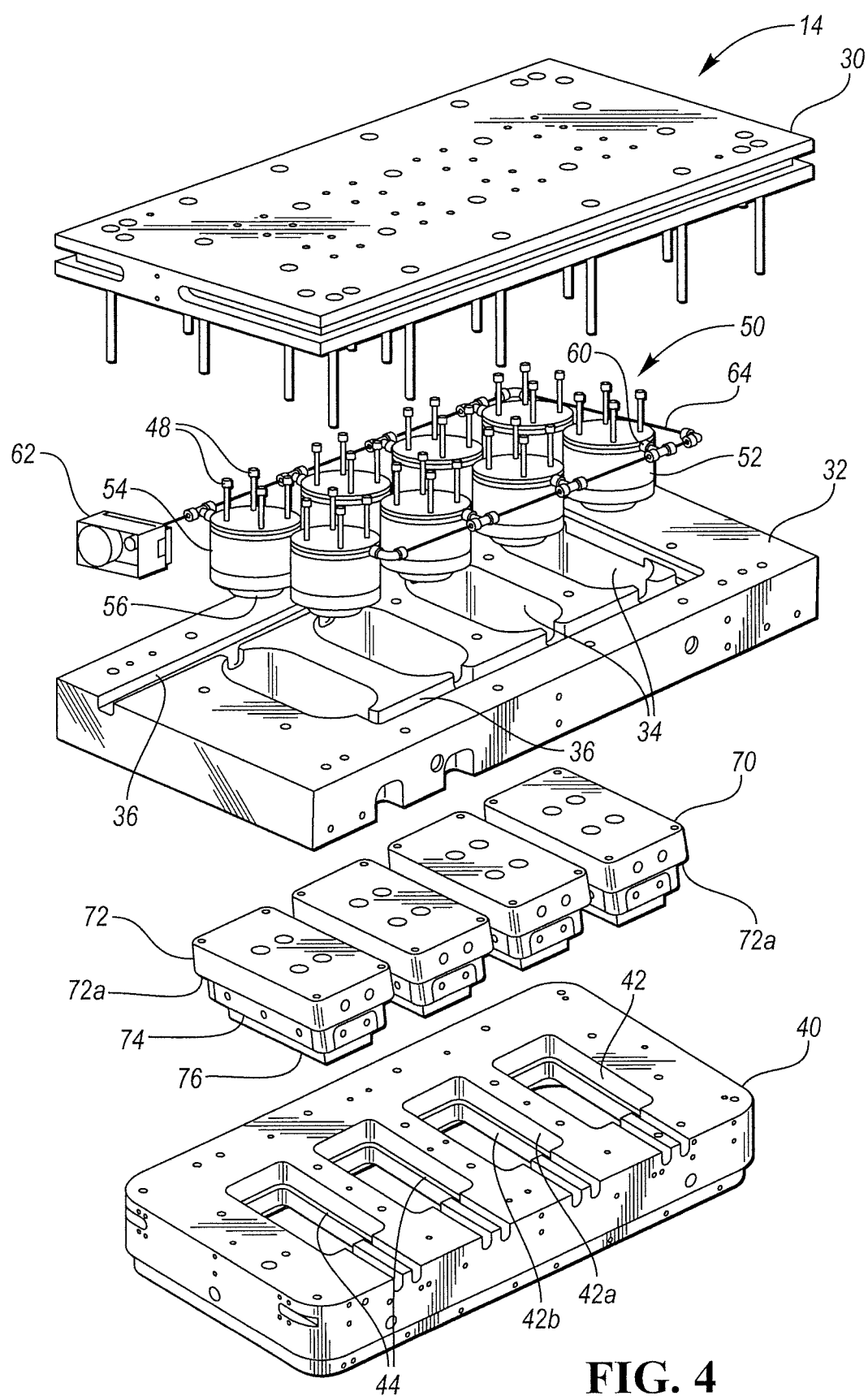
FIG. 4 is an exploded view of an upper assembly of a compression molding system.

Referring now to FIGS. 3 and 4, the upper assembly 14 may include an upper clamp plate 30 and an upper cylinder plate 32. The upper clamp plate 30 may be secured to the upper cylinder plate 32 through threaded bolts or other suitable fasteners. As shown in FIG. 4, the upper cylinder plate 32 may include aperture walls 34 defining a plurality of apertures disposed through the thickness of the upper cylinder plate 32. The upper cylinder plate 32 may also include grooves or channels 36 for receiving and supporting conduit, as discussed in greater detail elsewhere herein.

The upper assembly 14 may also include an upper block 40. The upper block 40 may also be referred to as an insert housing. The upper block 40 may include aperture walls 42 defining a plurality of apertures disposed through the thickness of the upper block 40. The aperture walls 42 may include an upper wall portion 42a defining a first aperture dimension (e.g., a length or width of the aperture) and a lower wall portion 42b defining a second aperture dimension (e.g., a length or width of the aperture) that is less than that of the first aperture dimension. Due at least in part to the different aperture dimensions, the aperture walls 42 may form a stop surface or ledge 44 between the top and lower wall portions 42a, 42b. The ledge 44 may extend, for example, generally orthogonal to parallel to the upper wall portion 42a and/or the lower wall portion 42b. In this way, the distance between the top surface of the upper block 40 and the ledge 44 may define a height of the upper wall portion 42a, and the distance between the bottom surface of the upper block 40 and the ledge 44 may define a height of the lower wall portion 42b.

As shown in FIG. 3, one or more stops 46 may be disposed on a lower surface of the upper block 40. The stops 46 may engage the lower assembly 12 (e.g., at stops disposed on the lower block 20) to inhibit downward movement of the upper clamp plate 30, upper cylinder plate 32, and upper block 40 relative to the lower block 20.

As shown in FIG. 4, the upper assembly 14 may further include a gas spring system 50 having one or more gas springs 52. The gas springs 52 may be closed canisters containing a compressed gas. A gas spring 52 may include a cylinder body or portion 54 and a piston portion 56 that is movable relative to the cylinder portion 54. For example, the piston portion 56 may be compressed into the cylinder portion 54 when the gas spring 52 is under load. When not under load, the compressed gas may drive the piston portion 56 in a direction away from the cylinder portion 54.

The gas springs 52 may be disposed in the upper assembly 14 such that at least a portion of individual gas springs 52 (e.g., the cylinder portions 54) are disposed in the apertures of the upper cylinder plate 32. Connector rods 58 or other suitable fasteners may be used to secure the gas springs 52 to the upper clamp plate 30, for example, such that top surfaces of the cylinder portions 54 are pressed against the bottom surface of the upper clamp plate 30. In this way, the gas springs 52 may be rigidly fixed to the upper clamp plate 30 such that downward movement of the upper clamp plate 30 drives the cylinder portions 54 in the downward direction, and upward movement of the upper clamp plate 30 lifts the cylinder portions 54 in the upward direction.

A gas spring 52 may further include a fluid interface 60 for connecting the gas spring 52 to a fluid management system 62 through conduits 64. In one approach, individual gas springs 52 of the gas spring system 50 are linked together in fluid communication such that the gas spring system 50 is a linked system. The gas springs 52 may be linked by conduits 64 to a gas source through the fluid management system 62.

The fluid management system 62 may charge the gas springs 52 of the gas spring system 50 using a charging medium. The charging medium may be an inert gas such as nitrogen, or other suitable fluid. The charging medium may be charged, for example, to 50 bar to 150 bar.

In some approaches, a desired charging pressure may be set at a regulator of the fluid management system 62, and a controller may charge the gas springs 52 to the desired pressure. In other approaches, a shut-off valve may be opened to allow the individual gas springs 52 to reach a desired charging pressure. When the gas springs have been charged to the desired pressure, the shut-off valve may be closed.

In still another approach, the fluid management system 62 may include an accumulator. The accumulator may contain the charging medium, and may be in fluid communication with the gas springs 52. In this way, the fluid management system 62 may be provided with an increased charging medium volume, which in some approaches may reduce a relative change in pressure across the gas springs 52.

In still another approach, individual gas springs of the gas spring system are self-contained gas springs that operate independently of one another. Such self-contained gas spring may be pre-charged or individually adjusted prior to operation.

The upper assembly 14 may further include one or more inserts 70. For example, the upper assembly 14 may include four inserts 70. Each insert 70 may include a first body portion 72 and a second body portion 74. The first body portion 72 may have a height less than the height of the upper portion wall 42a of an aperture of the upper block 40. For example, the height of the first body portion 72 may be in the range of approximately 1 millimeter and approximately 6 millimeters less than the height of the upper wall portion 42a. The second body portion 74 may have a dimension (e.g., a length, a width or a length and width) less than the first body portion 72. In this way, at least a portion 72a of the first body portion 72 overhangs the second body portion 74.

Each insert 70 may further include a third body portion 76. The third body portion 76 may define a lower most surface that engages a molding material during operations. The lowermost surfaces may have geometries corresponding to a top portion of a desired article of manufacture. In this way, the inserts 70 and the cavities 26 may together form the shape of the desired article of manufacture.

In the assembled configuration, shown in FIG. 3, the inserts 70 may be disposed in the apertures of the upper block 40. More particularly, the upper wall portion 42a of the upper block 40 receives the first body portion 72 of an insert 70, the lower wall portion 42b receives the second body portion 74, and the overhang portion 72a of the insert 70 engages the ledge 44 formed on the aperture walls 42 of the upper block 40.

Also in the assembled configuration, the upper block 40 is secured to the upper cylinder plate 32. A bottom surface of the upper cylinder plate 32 may engage a top surface of the upper block 40. In one approach, the bottom surface of the upper cylinder plate 32 overlaps a portion of the inserts 70. In this way, the bottom surface of the upper cylinder plate 32 may inhibit upward movement of an insert 70 when a top surface of the insert 70 engages the bottom surface of the upper cylinder plate 32. However, due to the difference in height of the first body portion 72 and the upper wall portion 42a, the bottom surface of the upper cylinder plate 32 is spaced from the top surface of the inserts 70 when the system is at rest (e.g., when gravity maintains the overhanging portion 72a of the insert 70 in engagement with the ledge 44 of the upper block 40).

Also in the assembled configuration, the gas springs 52 of the gas spring system 50 are secured to the upper clamp plate 30 such that they "hang" down into the apertures of the upper block 40. The piston portions 56 of the gas springs 52 engage the top surface of the inserts 70.

In use, a blank may be loaded in the cavities 26 of the lower block 20 of the lower assembly 14. The upper assembly 14 may be lowered to an engagement position. In the engagement position, the third body portions 76 of the inserts 70 engage the molding material disposed in the cavities 26. Also in the engagement position, the stops 46 may engage the lower assembly 12 (e.g., at stops disposed on the lower block 20) to inhibit further downward movement of the upper clamp plate 30, upper cylinder plate 32, and upper block 40 relative to the lower block 20.

In some instances, the thickness of the molding material placed in the cavities 26 may vary from cavity to cavity. This may be due, for example, to variation in prepreg fiber areal mass or resin content, or due to material deformation during preforming or resin bleed during molding. With conventional compression molding systems, variation in molding material thickness can lead to each component being molded at a different pressure. For example, in hydraulic presses with active leveling systems, variations in molding material thicknesses may result in the component with greatest volume of material setting the final closure height and being subjected to higher pressures as compared to components having less volume. Such variable pressure molding can adversely affect the material properties and performance of the molded component. Furthermore, part scrap rates may increase, thereby increasing manufacturing costs.

In this regard, the inserts 70 of the compression molding system 10 described herein may be said to "float" within the apertures of the upper block 40. More particularly, each insert 70 may be movable between multiple vertical positions within the apertures of the upper block 40.

Figure 6:
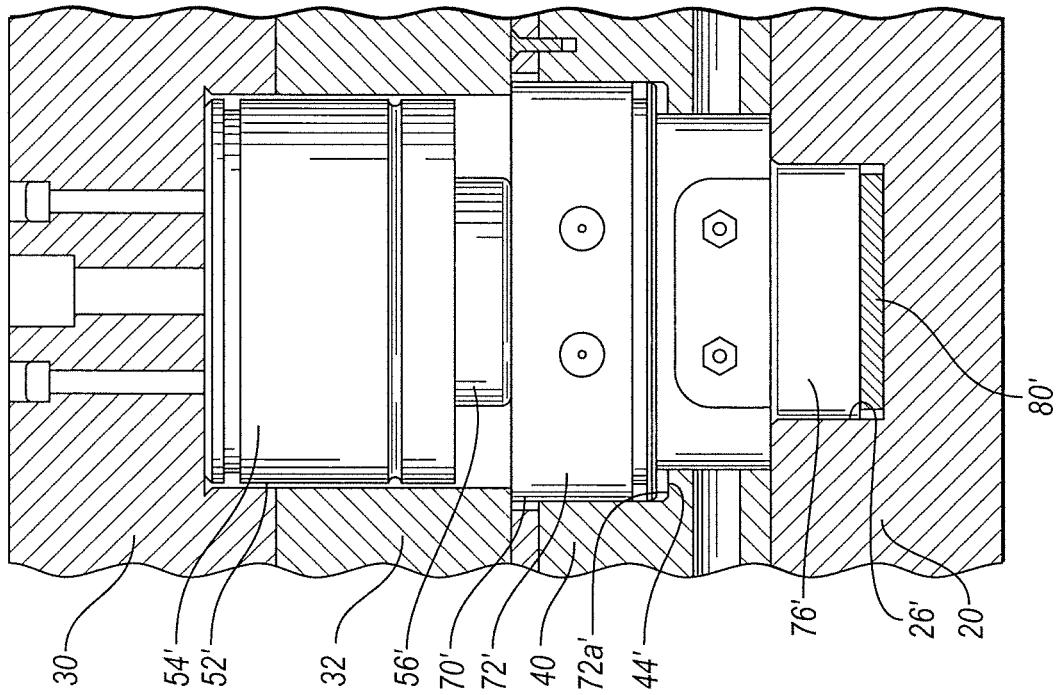
FIG. 6 is a cross-sectional view of a portion of a compression molding system in a second configuration.
Figure 5:
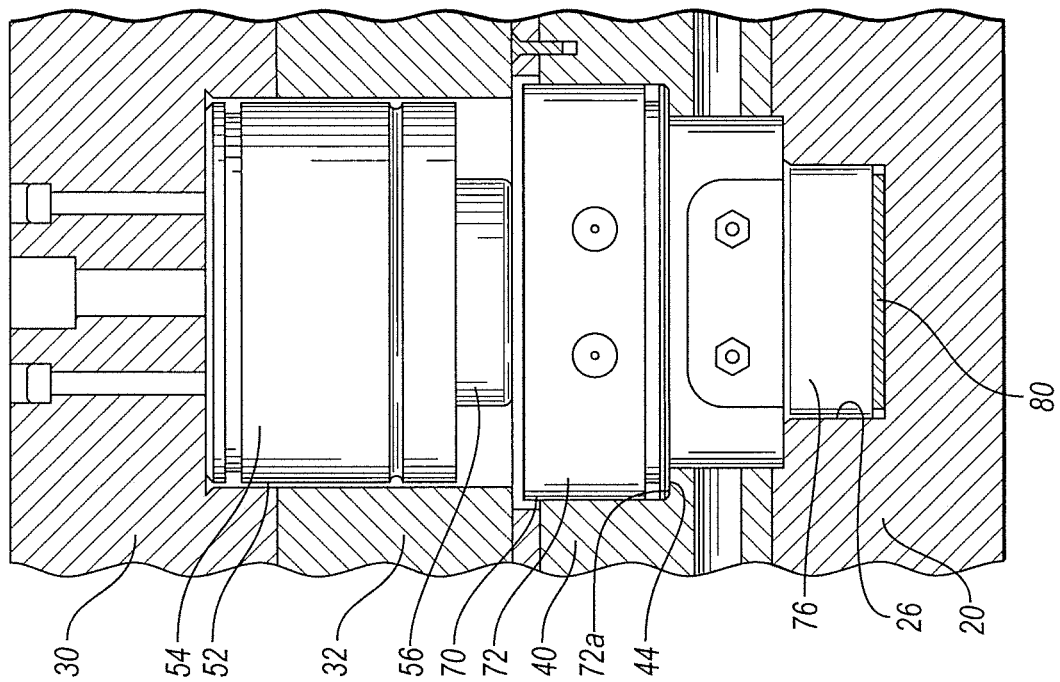
FIG. 5 is a cross-sectional view of a portion of a compression molding system in a first configuration.

Referring now to FIGS. 5 and 6, the compression molding system 10 is shown during a molding cycle. Corresponding parts are designated herein with a "'" symbol.

A first blank 80, shown in FIG. 5, may be disposed in a first cavity 26, and a second blank 80', shown FIG. 6, may be disposed in a second cavity 26'. The first blank 80' may have a first thickness, and the second blank 80' may have a second thickness greater than the first thickness; for example, 5 millimeters greater than the first thickness.

During the cycle, the upper assembly 14 is lowered in the direction of the lower assembly 12. Upon sufficient displacement of the upper assembly 14, the inserts 70, 70' engage the blanks 80, 80'. More particularly, engagement surfaces of the third body portions 76, 76' of the inserts 70, 70' engage respective blanks 80, 80'. Also upon sufficient displacement of the upper assembly 14, stops disposed on the upper and/or lower assemblies 12, 14 may engage to inhibit further displacement of the upper assembly 14 relative to the lower assembly 12.

Referring to FIG. 5, the gas spring 52 associated with the first cavity 26 exerts a force, through the piston portion 56, on the insert 70. Due at least in part to this force and the thickness of the first blank 80, the insert 70 is maintained in a first vertical position. More particularly, the insert 70 is maintained such that the overhanging portion 72a engages the ledge 44 of the upper block 40. In another approach, the thickness of the first blank 80 may cause the overhanging portion 72 to disengage from the ledge 44 of the upper block 40. The distance may be a first distance, such as 1 millimeter.

Referring to FIG. 6, the gas spring 52' associated with the second cavity 26' exerts a force, through the piston portion 56', on the insert 70'. Due at least in part to the thickness of the second blank 80', the insert 70' is moved (i.e., "floats") from a first vertical position (corresponding to the first vertical position of insert 70 of FIG. 5) to a second vertical position vertically offset from the first vertical position. More particularly, the insert 70' is moved vertically such that the overhanging portion 72a is spaced apart from the ledge 44 of the upper block 40. The insert 70' may be moved in a vertical direction by a distance D; for example, 5 millimeters. Movement of the blank 80' in the vertical direction causes the piston portion 56 of the gas spring 52 to compress into the cylinder portion 54 of the gas spring by a corresponding distance, such as 5 millimeters.

In this way, the insert 70' associated with the second cavity 26' may be displaced a greater distance than the insert 70 associated with the first cavity 26. As such, the piston portion 56' of gas spring 52' may be compressed a greater distance than the piston portion 56 of gas spring 52. Despite this difference in stroke distance, the gas springs 52, 52' continue to exert a constant force, or substantially constant force, on the inserts 70, 70'. As such, the force exerted on the blank 80' by the insert 70' associated with the second cavity 26' may correspond to (e.g., be the same force, or substantially the same force) as the force exerted on the blank 80 by the insert 70 associated with the first cavity 26. In this way, the compression molding system 10 may permit independent movement of the inserts 70, 70' while maintaining a substantially uniform pressure on the blanks 80, 80' across the cavities 26, 26' during the compression cycle despite the blanks 80, 80' having varying thickness. As used herein, movement of one insert may be independent of movement of another insert when the movement of one does not cause movement of another.

In one example, four blanks of molding material having varying thickness may be loaded into respective cavities. After the upper assembly 14 has been brought into engagement with the lower assembly 12, the molding material is molded within the cavities. Before the onset of material curing, pressure may be stabilized within the cavities. In this example, pressure in a first cavity is maintained at approximately 1,169 psi, pressure in a second cavity is maintained at approximately 1,160 psi, pressure in a third cavity is maintained at approximately 1,159 psi, and pressure in a fourth cavity is maintained at approximately 1,147 psi. Thus, the pressure difference across the four cavities is approximately 22 psi during the stabilized cavity pressure stage.

The compression molding system 10 thus allows for substantially equal pressure compression molding across multiple cavities, while also accounting for thickness variability among the pre-molded components.

Figure 7:
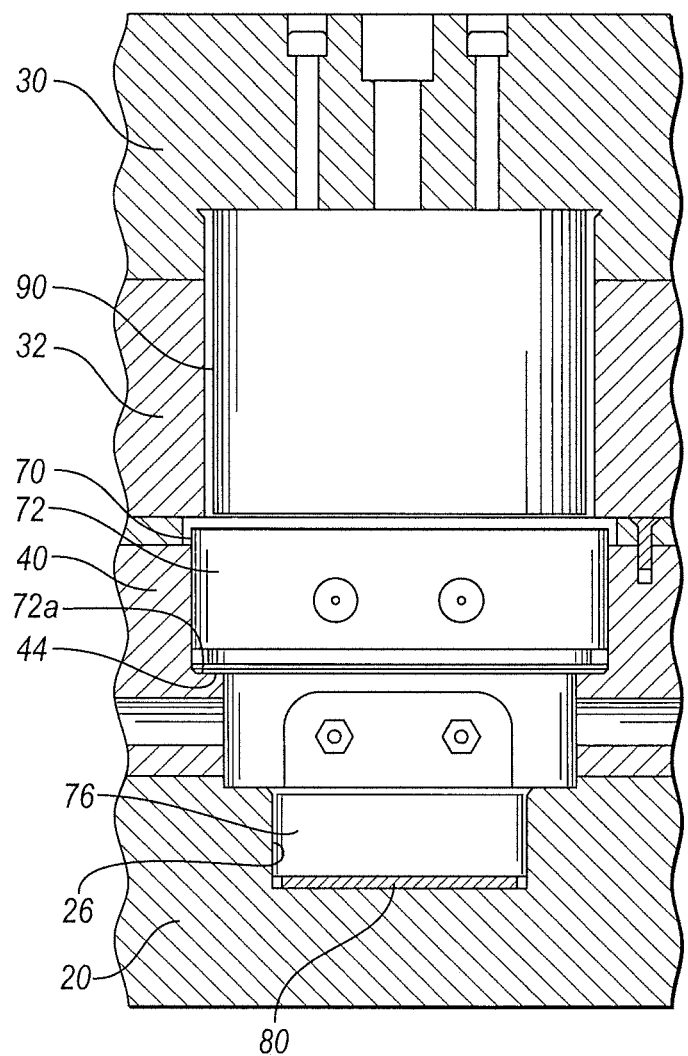
FIG. 7 is a cross-sectional view of a portion of a compression molding system in an alternative configuration.

Referring now to FIG. 7, in still another approach, in place of the gas springs 52, the compression molding system 10 may be provided with dummy cylinders 90 disposed in the apertures of the upper cylinder plate 32. In this way, the compression molding system 10 may allow for compression molding without the need for a gas spring system 50.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A compression molding assembly comprising:
a lower assembly defining a plurality of cavities; and
an upper assembly disposed opposite the lower assembly, the upper assembly including
an upper clamp plate,
an upper cylinder plate secured to the upper clamp plate, wherein the upper cylinder plate defines a plurality of upper cylinder plate apertures disposed therethrough,
a gas spring system including a plurality of gas springs secured to the upper clamp plate and disposed in the upper cylinder plate apertures, wherein individual gas springs of the plurality of gas springs include a cylinder body and a piston,
an upper block secured to the upper cylinder plate, wherein the upper block includes upper block apertures disposed adjacent the upper cylinder plate apertures, and wherein the upper block defines stop surfaces disposed at the upper block apertures, wherein the upper block defines an individual upper block aperture having an upper wall portion defining a first width and a lower wall portion defining a second width less than the first width, and wherein the stop surface is disposed between the upper wall portion and the lower wall portion, and
a plurality of inserts disposed in the upper block apertures and in engagement with the pistons of the gas springs, wherein an individual insert of the plurality of inserts includes a body portion moveable between a first position wherein the body portion is engaged with the stop surface, and a second position wherein the body portion is spaced from the stop surface, wherein the body portion is a first body portion, wherein the first body portion has a height less than a height of the upper wall portion of the individual upper block aperture, and wherein the first body portion is disposed in the upper wall portion of the individual upper block aperture.

2. The compression molding assembly of claim 1, wherein the plurality of cavities is four or more discrete cavities.

3. The compression molding assembly of claim 1, wherein two gas springs are disposed in an individual upper cylinder plate aperture.

4. The compression molding assembly of claim 1, wherein individual gas springs of the plurality of gas springs are linked in fluid communication by one or more conduits.

5. The compression molding assembly of claim 4, wherein the one or more conduits are disposed between the upper clamp plate and the upper cylinder plate.

6. The compression molding assembly of claim 1, wherein individual gas springs of the plurality of gas springs include a charging medium adapted to be charged to a pressure in a range of approximately 50 bar to approximately 150 bar.

7. The compression molding assembly of claim 1, wherein the individual insert further includes a second body portion adjacent the first body portion, wherein the second body portion has a width less than a width of the first body portion, and wherein the second body portion is disposed in the lower wall portion of the individual upper block aperture.

8. The compression molding assembly of claim 7, wherein the individual insert further includes a third body portion adjacent the second body portion, wherein the third body portion has a width less than the width of the second body portion, and wherein the second body portion is disposed below a bottom wall of the upper block when the first body portion is in engagement with the stop surface.

9. The compression molding assembly of claim 1, wherein a first individual insert is adapted to move a first distance from the first position to the second position, and wherein a second individual insert is adapted to move a second distance from the first position to a third position, the second distance being greater than the first distance.

10. The compression molding assembly of claim 9, wherein a first gas spring is adapted to apply a first force on the first individual insert in the second position, and wherein a second gas spring is adapted to apply a second force on the second individual insert in the third position, the second force substantially corresponding to the first force.

11. An assembly for compression molding comprising:
an insert housing defining a plurality of apertures having stop surfaces;
a plurality of inserts disposed within the apertures and in engagement with the stop surfaces; and
a plurality of gas springs in biased engagement with the inserts, individual gas springs of the plurality of gas springs being adapted to independently compress under load to permit independent movement of individual inserts within the apertures relative to the insert housing, wherein the insert housing defines an individual aperture having an upper wall portion defining a first width and a lower wall portion defining a second width less than the first width, and wherein a stop surface is disposed between the upper wall portion and the lower wall portion, wherein an individual insert defines a first body portion, wherein the first body portion has a height less than a height of the upper wall portion of the individual aperture, and wherein the first body portion is disposed in the upper wall portion of the individual aperture.

12. The assembly of claim 11, wherein the individual insert further includes a second body portion adjacent the first body portion, wherein the second body portion has a width less than a width of the first body portion, and wherein the second body portion is disposed in the lower wall portion of the individual aperture.

13. The assembly of claim 11, wherein a first individual insert is adapted to move a first distance relative to the insert housing to a first position, and a second individual insert is adapted to move a second distance relative to the insert housing to a second position, the second distance greater than the first distance, and wherein a first gas spring is adapted to apply a first force on the first individual insert in the first position, and wherein a second gas spring is adapted to apply a second force on the second individual insert in the second position, the second force substantially corresponding to the first force.

* * * * *